UNITED STATES PATENT OFFICE.

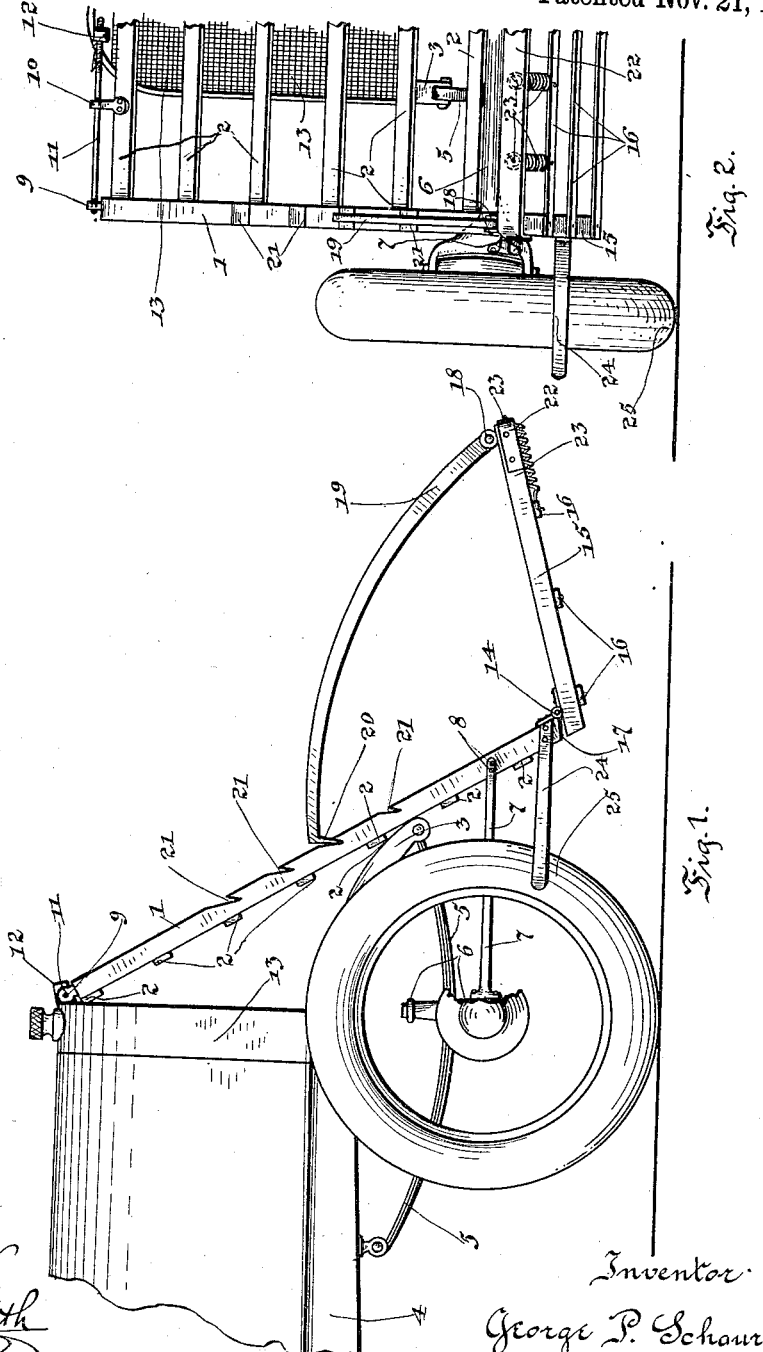

GEORGE P. SCHAURER, OF CHICAGO, ILLINOIS, ASSIGNOR OF ONE-HALF TO IDA M. HEATH, OF CHICAGO, ILLINOIS.

AUTOMOBILE-FENDER.

1,009,187.            Specification of Letters Patent.      Patented Nov. 21, 1911.

Application filed January 30, 1911. Serial No. 605,518.

*To all whom it may concern:*

Be it known that I, GEORGE P. SCHAURER, a citizen of the United States, and a resident of the city of Chicago, county of Cook, and State of Illinois, have invented certain new and useful Improvements in Automobile-Fenders, of which the following is a specification.

My invention relates to improvements in fenders designed particularly for use on automobiles, but which may be applied to street cars and other vehicles.

The object of my invention is the provision of an automobile fender which shall be so constructed as to reduce to a minimum the shock occasioned by the impact with a person.

A further object of my invention is to provide a fender of the character mentioned which may be expeditiously attached to the front of an automobile of the conventional design, and a further object is to provide a fender which shall be simple of construction.

Other objects will appear hereinafter.

With these objects in view my invention consists in the novel construction and arrangements of parts as will be hereinafter fully described and more particularly pointed out in the appended claims.

My invention will be more readily understood by reference to the accompanying drawings forming a part of this specification, and in which—

Figure 1 is a side elevation of a portion of an automobile to which my improved fender is attached, and Fig. 2 is a front elevation of a portion of the automobile with the fender attached and in its normal position.

The preferred form of construction of my invention, as illustrated in the accompanying drawings, comprises an inclined frame having side members 1 and a series of transverse members 2, one of the latter being supported by the front ends 3 of the automobile frame 4. The frame 4 is provided with the usual semielliptic springs 5 which are secured to the front axle 6 in the usual manner.

In Fig. 2 one side only of the fender is shown, it being understood that the other side is of the same construction, the design being symmetrical.

Secured to the front axle 6 and extending forwardly therefrom are brace members 7, the forward ends of which are detachably secured to the exterior surfaces of the members 1 by means of screws 8, thus forming a rigid connection and supporting means for the lower end of the fender. The upper ends of the members 1 are provided with projecting perforated lugs 9, and the uppermost transverse member 2 is provided with perforated lugs 10 secured thereto as illustrated in Fig. 2. Passing through the perforations of the lugs 9 and 10 on each side of the fender is a threaded rod 11, the threaded portion of which is screwed into a socket 12 which projects forwardly from the top of the radiator 13 of the automobile. By means of this construction, the upper portion of the fender is readily attached to or detached from the radiator 13, it being understood that the rod 11 is so mounted in the perforations of the lugs 9 and 10 as to rotate and to move longitudinally therein. A certain distance is provided between the lugs 10 and sockets 12 in order to provide ample clearance for varying widths of radiators 13. Cushions may also be provided for the frame 1—2.

From the above construction, it is clear that the frame comprising the member 1 and 2 is rigidly supported and may be attached to or detached from the automobile in an expeditious manner.

The mechanism designed for the reception of a person and to prevent the same from injury when struck by the fender, will now be described.

Hinged at the lower ends of the members 1 by means of hinges 14 is an oscillatory frame having side members 15 and transverse members 16, the latter being secured to said side members as indicated in Figs.

1 and 2. The lower ends of the members 1 have inclined surfaces 17 which serve as stops for the members 15 in preventing the same from falling below a horizontal position, the position shown being somewhat above the horizontal. Provided at the forward ends of the side members 15 and extending from the top surfaces thereof are eyes 18 to which elongated curved pawls 19 are pivoted, the latter having hooks 20 at their rearward extremities. The frame consisting of side members 15 and transverse members 16 is oscillatory as aforesaid, and when the same is moved upwardly the hooks 20 of the pawls 19 are adapted to engage any one of a series of recesses 21 provided in the said members 1, the particular recess so engaged being determined by the extent of upward movement of said frame. The form of the recesses 21 is such that the hooks 20 will be safely locked therein automatically, and any weight which may be received on the oscillatory frame will be rigidly supported.

In order to prevent an injurious shock to a person who is accidentally struck by the fender, a flexible belt 22 is positioned across the front of the oscillatory frame and secured to the forward ends of the side members 15, as clearly illustrated in Fig. 1. The belt 22 may be of leather or any other suitable material and the same is preferably reinforced by a plurality of helical springs 23 interposed therebetween and the forward transverse members 16 of the oscillatory frame. In this manner sufficient resiliency is obtained to reduce the impact occasioned by a person striking the fender. In case the person is thrown to one side of the fender, inclined iron guards 24 are provided and secured to the lower ends of the side members 1 as illustrated in Fig. 1. These guards extend rearwardly and preclude the possibility of a person coming in contact with the forward wheels 25 of the automobile.

In operation, when a person contacts with the flexible belt 22, the same is flexed, thus reducing the shock as aforesaid, and the entire oscillatory frame 15—16 is moved upwardly and rearwardly, thus further reducing the shock. Simultaneously, with this movement, the hooks 20 of the pawls 19 travel upwardly on the members 1 and engage with the recesses 21 at the completion of the movement. Should the person struck fall onto frame 15—16 he will be supported thereby.

An automobile fender of the construction set forth is neat of appearance and efficient in performing its functions.

While I have illustrated and described, the preferred form of my improved automobile fender, this is capable of variation without departing from the spirit of the invention. I, therefore, do not wish to be limited to the exact details of construction as set forth, but desire to avail myself of such variations and modifications as come within the scope of the appended claims.

Having described my invention what I claim as new and desire to secure by Letters Patent is:—

1. In a fender of the class described, an inclined frame rigidly secured to the front of the automobile and having a series of V-shaped recesses formed therein, an oscillatory frame pivoted to the lower edge of said inclined frame, a pair of pawls pivoted to the front of said oscillatory frame and having integral hooks formed thereon for engaging said recesses, and a resilient member provided on the front of said oscillatory frame, substantially as described.

2. In a fender of the class described, an inclined frame rigidly secured to the radiator of the automobile and having a series of recesses formed therein, an oscillatory frame pivoted to the lower edge of said inclined frame, the latter having stops for limiting the fall of said oscillatory frame, a pair of pawls pivoted to the front of said oscillatory frame and having hooks for engaging said recesses, and a flexible belt provided on the front of said oscillatory frame, substantially as described.

3. In a fender of the class described, a main frame comprising a pair of side inclined members and a series of transverse members, said side members having a series of V-shaped recesses formed therein, perforated lugs provided at the top of said frame, a threaded socket projecting from the automobile radiator, a threaded rod passing through said lugs and screwed into said socket, means for securing the lower end of said frame to the front axle of the automobile, an oscillatory frame hinged to the lower portion of said main frame, a pair of pawls pivoted to the front of said oscillatory frame and having hooks formed integral therewith for engaging said recesses, and resilient means provided on the front of said oscillatory frame, substantially as described.

4. In a fender of the class described, a main frame comprising a pair of side inclined members and a series of transverse members, said side members having a series of V-shaped recesses formed in the front edges thereof, perforated lugs provided at the top of said main frame, a threaded socket projecting from the automobile radiator, a threaded rod passing through said lugs and screwed into said socket, means for securing the lower end of said frame to the front axle of the automobile, an oscillatory frame hinged to the lower portion of said main frame, a pair of pawls pivoted to the front corners of said oscillatory frame and having hooks formed integral therewith and for engaging said recesses, and resilient means provided on the front of said oscillatory frame comprising a flexible belt the ends of which are secured to the oscillatory frame, and helical springs attached to said belt for reinforcing the same, substantially as described.

In testimony whereof I have signed my name to this specification in the presence of two subscribing witnesses.

GEORGE P. SCHAURER.

Witnesses:
HELEN F. LILLIS,
JOSHUA R. H. POTTS.

Copies of this patent may be obtained for five cents each, by addressing the "Commissioner of Patents, Washington, D. C."